US005445882A

United States Patent [19]

Kobayashi et al.

[11] Patent Number: 5,445,882

[45] Date of Patent: Aug. 29, 1995

[54] SUPPORT SHEET FOR PHOTOGRAPHIC PRINTING SHEET

[75] Inventors: Yasushi Kobayashi, Ichikawa; Masahiro Kamiya, Tokyo; Toshifumi Fujii, Iwaki, all of Japan

[73] Assignee: New OJI Paper Co., Ltd., Tokyo, Japan

[21] Appl. No.: 360,098

[22] Filed: Dec. 20, 1994

[30] Foreign Application Priority Data

Dec. 28, 1993 [JP] Japan .................................. 5-335084

[51] Int. Cl.[6] .......................... B32B 5/16; G03C 1/76; G03C 1/815

[52] U.S. Cl. .................................... 428/329; 430/510; 430/523; 430/532; 430/538; 430/935

[58] Field of Search ............... 428/340, 329, 330, 328, 428/913, 513, 514, 520, 516; 430/510, 523, 532, 538, 935

[56] References Cited

U.S. PATENT DOCUMENTS

| | | | |
|---|---|---|---|
| 4,364,971 | 12/1982 | Sack et al. . | |
| 4,384,040 | 5/1983 | von Meer . | |
| 4,645,736 | 2/1987 | Anthonsen et al. . | |
| 5,055,320 | 10/1991 | Miura et al. | 428/512 |
| 5,296,447 | 3/1994 | Suto et al. | 428/206 |
| 5,374,508 | 12/1994 | Miura et al. | 430/510 |

FOREIGN PATENT DOCUMENTS

| | | |
|---|---|---|
| 57-49946 | 3/1982 | Japan . |
| 60-70446 | 4/1985 | Japan . |
| 61-201241 | 9/1986 | Japan . |
| 61-236547 | 10/1986 | Japan . |
| 62-61049 | 3/1987 | Japan . |
| 62-109046 | 5/1987 | Japan . |
| 2-47 | 1/1990 | Japan . |
| 5-93984 | 4/1993 | Japan . |

*Primary Examiner*—P. C. Sluby
*Attorney, Agent, or Firm*—Armstrong, Westerman, Hattori, McLeland and Naughton

[57] ABSTRACT

The photographic paper support sheet having enhanced resistance to yellowing and satisfactory flexibility includes a front surface coating layer formed on a substrate paper sheet and having a laminate structure which includes an inside electron-beam-cured resin layer and an outermost electron-beam-cured resin layer derived from an electron-beam-curable coating liquid composition containing compounds (A) and (B) of the formulae (I) and (II).

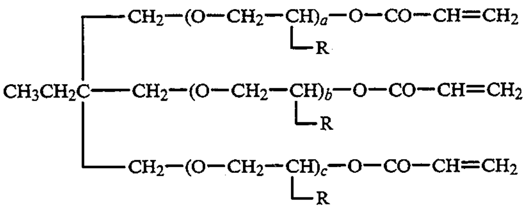

(I)

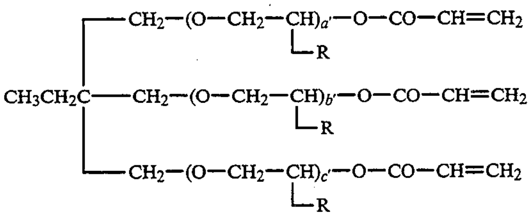

(II)

wherein R=—H or —$CH_3$, a, b and c=0 or 1 to 4, a+b+c=1 to 4, a', b' and c'=0 or 1 to 8, and a'+b'+c'=5 to 8, in a weight ratio (A)/(B) of 30/70 to 90/10.

13 Claims, No Drawings

SUPPORT SHEET FOR PHOTOGRAPHIC PRINTING SHEET

BACKGROUND OF THE INVENTION

1. Field of the Invention

The present invention relates to a support sheet for a photographic printing sheet, more particularly, the present invention relates to a support sheet for a photographic printing sheet, having an electron beam-cured resin layer, exhibiting an excellent resistance to yellowing thereof by the developing treatment and having sufficient flexibility.

2. Description of the Related Art

Currently, a polyolefin-coated support sheet, produced by coating both surfaces of a substrate, consisting of a paper sheet, with a polyolefin resin, is widely employed as a support sheet for photographic printing paper. This type of support sheet is advantageous in that in a develop-fixing treatment for a resultant photographic printing paper sheet, since the treating liquid does not penetrate into the support sheet, the shrinkage and elongation of the support sheet are restricted and thus the support sheet exhibits an excellent dimensional stability.

For the purpose of enhancing the opacity or the image-forming properties, the polyolefin resin in the coating layer of the support sheet is mixed with an inorganic white pigment such as titanium dioxide. The pigment has a poor dispersing property in the resin and causes a problem in that when the resin is melt-extruded, the resin is foamed by a volatile component contained in the pigment and thus the resultant resin coating layer is cracked or broken. For this reason, it is impossible to increase the content of the pigment in the coating layer to a level sufficient to obtain a satisfactory opacity and suitable image-forming properties.

Generally speaking, when titanium dioxide pigment is employed, it is difficult to add this pigment at a rate of more than about 20% by weight. Therefore, the photographic printing paper produced from this type of support sheet for photographic printing sheet is unsatisfactory in the sharpness of the image.

Recently, a support sheet for photographic printing paper, having an electron-beam-cured resin-coated layer formed by coating a resin composition curable by electron beam irradiation, namely an electron-beam-curable resin, on a support sheet, was provided by, for example, Japanese Examined Patent Publication (Kokoku) No. 60-17,104, Japanese Examined Patent Publication (Kokoku) No. 60-17,105, and Japanese Unexamined Patent Publication (Kokai) No. 57-49,496. In accordance with this method, when the coating layer is formed, it is unnecessary to heat and melt the resin composition at a high temperature, and thus the pigment content can increase from 20 to 80% by weight. Therefore, the photographic printing paper sheet produced with the above-mentioned type of support sheet has a significantly enhanced image sharpness in comparison with the conventional photographic printing paper sheet having polyolefin resin coating layers. Nevertheless, with respect to the photographic printing paper produced by coating a photographic photosensitive layer on an electron-beam-cured resin-coating layer cured by an electron-beam irradiation, it is known that in the developing treatment, a phenomenon that a photographic developing reagent is absorbed by and remains in the resin coating layer, and thus the photographic printing sheet is discolored yellow after the developing treatment, namely a yellowing phenomenon occurs, and when a developing treatment is applied to the photographic printing paper after a storage period, the degree of fogging can increase to a level not negligible for practical use and the photosensitivity thereof can change. It is also known that the resultant coating layer is hard and has little flexibility and thus is sometimes cracked or broken.

There have been made various attempts to prevent the above-mentioned yellowing problem and to make the electron-beam-cured resin layer flexible. In these attempts specific electron-beam-curable polymers or electron-beam-curable monomers are employed. For example, Japanese Unexamined Patent Publication (Kokai) No. 59-124,336 discloses specific electron-beam-curable acrylic acid ester monomers, Japanese Unexamined Patent Publication (Kokai) No. 60-70,446 discloses specific urethane resins having double bonds. Japanese Unexamined Patent Publication (Kokai) No. 61-201,241 discloses specific diacrylates, triacrylates and expoxidized acrylates. Japanese Unexamined Patent Publication (Kokai) No. 61-236,547 discloses specific tetraacrylic acid esters. Japanese Unexamined Patent Publication (Kokai) No. 62-61,049 discloses specific hexaacrylate esters. Japanese Unexamined Patent Publication (Kokai) No. 62-109,046 discloses specific polybutadiene-containing resins. Japanese Unexamined Patent Publication (Kokai) No. 2-47 discloses specific acrylate esters of addition products of acrylic acid polymers with polyhydric alcohols.

These specific electron-beam-curable compounds do not, however, completely solve the above-mentioned problems.

It is known that these is a close relationship between the yellowing phenomenon and the flexibility of the electron-beam-cured resin and those properties are not proportional with the exposed dose of the electron-beam. Namely, when the electron-beam is irradiated at a high exposure dose, the resultant cured resin layer exhibits a reduced flexibility although the yellowing phenomenon thereof is restricted. Also, the high dose of the electron-beam causes the substrate paper sheet to exhibit a reduced mechanical strength and a deteriorated quality. Also, when the electron beam is irradiated at a low exposure dose, the resultant cured resin layer exhibits a significantly increased yellowing phenomenon, although the flexibility of the cured resin layer is secured to a certain extent. Also, the cured resin layer exhibits reduced adhesive property and mechanical strength.

Accordingly, to prevent the yellowing phenomenon without reducing the physical properties of the cured resin layer, it is necessary to provide a structure of a new support sheet in which an appropriately selected electron-beam-curable unsaturated organic compound is used, and even when the electron-beam is applied in an exposure dose large enough to bring about the formation of crosslinkages in the cured resin layer, the flexibility of the cured resin layer and the mechanical properties and quality of the substrate paper sheet are not deteriorated. It is very important to effectively eliminate all the above-mentioned problems simultaneously.

SUMMARY OF THE INVENTION

An object of the present invention is to eliminate the above-mentioned problems in the prior arts and to provide a support sheet suitable for producing a photographic printing paper having excellent photographic properties, namely, a high surface smoothness, high waterproofness, a high flexibility, and a high yellowing-preventing property.

The support sheet for photographic printing paper of the present invention for attaining the above-mentioned object comprises a substrate paper sheet; a front surface coating layer formed on the front surface of the substrate paper sheet and comprising an electron-beam-cured resin product of at least one unsaturated organic compound which is curable by electron beam irradiation; and a back surface coating layer formed on a back surface of the substrate paper sheet and comprising at least one film-forming synthetic resin, the front surface coating layers having a laminated structure which comprises an inside cured resin layer located adjacent to the substrate paper sheet and an outermost cured resin layer located in an outermost front surface side of the support sheet, and the outermost cured resin layer comprising an electron beam-cured resin product derived from a coating composition which comprises (A) at least one unsaturated organic compound of the formula (I) and (B) at least one unsaturated organic compound of the formula (II):

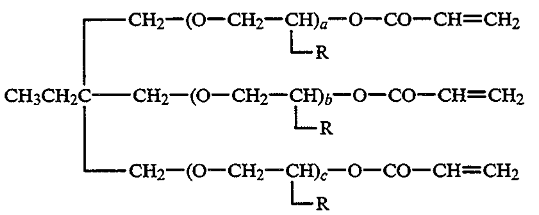
(I)

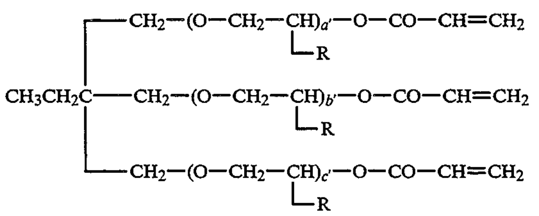
(II)

in which formulae (I) and (II), R represents a member selected from a group consisting of a hydrogen atom and a methyl group, a, b and c respectively and independently from each other represent zero or an integer of 1 to 4, the sum of a, b and c is 1 to 4, a′, b′, and c′, respectively and independently from each other represent zero or an integer of 1 to 8 and the sum of a′, b′ and c′ is 5 to 8, in a weight ratio of the compound (A) of the formula (I) to the compound (B) of the formula (II) of 30/70 to 90/10.

DESCRIPTION OF THE PREFERRED EMBODIMENT

As mentioned above, in a conventional photographic printing paper produced from a support sheet which is produced by coating an available electron-beam-curable unsaturated organic compound composition on a substrate paper sheet comprising a natural pulp as a principle component thereof, a phenomenon of yellow discoloring after developing treatment, namely a yellowing phenomenon occurs. Although the reasons for the yellowing phenomenon are not completely clear, it is assumed that a principal reagent in the photographic developing agent is absorbed by and remains in the support sheet and is then oxidized to discolor the support sheet.

To prevent the yellowing, it is effective to reduce the absorption of the developing reagent by the cured resin layer. To prevent the absorption of the developing reagent, it is effective to increase the cross-linking density of the cured resin layer of the support sheet. For this purpose, an increase in the exposure dose of the electron beam for curing the unsaturated organic compound composition, by increasing the content of the polyfunctional unsaturated organic compound monomer or oligomer to be used, and an increase in the content of the unsaturated organic compound having a relatively low molecular weight are effective.

However, these methods are disadvantageous in that the flexibility of the coating layer is reduced, fogging of the resultant photographic printing paper is promoted when the electron beam is irradiated at an increased exposure dose, and the substrate paper sheet is discolored yellow by shock due to the electron beam irradiation.

The inventors of the present invention investigated these points and as a result, found that the above-mentioned problems can be effectively dissolved by forming the outermost cured resin layer of the front surface coating layer from a specific electron-beam-curable unsaturated organic compound composition containing a specific unsaturated organic compound (A) capable of producing an electron-beam-cured resin having a high cross-linking density and a specific unsaturated organic compound (B) which contains a relatively large content of addition-reacted modified ethyleneoxide and propyleneoxide components and is thus capable of producing an electron-beam-cured resin having a low cross-linking density and a high flexibility, the compounds (A) and (B) being mixed in a specific mixing weight ratio. Namely, the specific unsaturated organic compound composition can attain simultaneously the enhancement of the flexibility and the prevention of the yellowing phenomenon on the outermost cured resin layer.

In the support sheet of the present invention for photographic printing sheet, a front surface coating layer is formed on a front surface of a substrate paper sheet which comprises, as a principal component, a natural pulp, and a back surface coating layer is formed on a back surface of the substrate paper sheet.

The front surface coating layer comprises an electron-beam-cured resin product of at least one unsaturated organic compound curable by electron beam irradiation.

The back surface coating layer comprises a film-forming synthetic resin.

In the present invention, the front surface coating layer has a laminated structure comprising an inside cured resin layer located adjacent to the substrate paper sheet and derived from an electron beam-curable unsaturated organic compound composition; and an outermost cured resin layer located in an outermost front surface side of the support sheet.

The outermost cured resin layer of the present invention comprises an electron-beam-cured resin product produced by applying an electron-beam irradiation to a specific coating composition comprising:

(A) at least one unsaturated organic compound of the formula (I), and (B) at least one unsaturated organic compound of the formula (II):

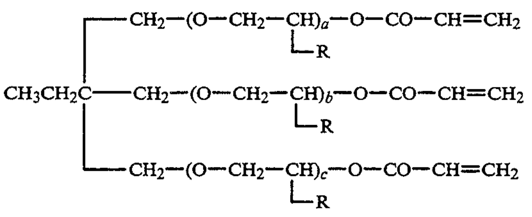
(I)

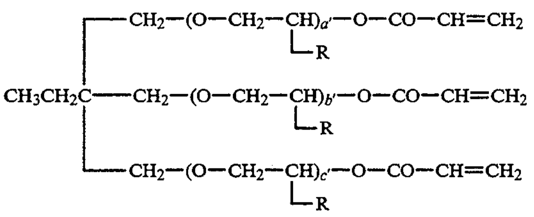
(II)

In the formulae (I) and (II), R represents a member selected from a group consisting of a hydrogen atom and a methyl group, a, b and c respectively and independently from each other represent zero or an integer of 1 to 4, the sum of a, b and c is 1 to 4, a', b' and c' respectively and independently from each other represent zero or an integer of 1 to 8 and the sum of a', b' and c' is 5 to 8. The compound (A) of the formula (I) and the compound (B) of the formula (II) are mixed in a mixing weight ratio ((A)/(B)) of 30/70 to 90/10.

The specific unsaturated compounds of the formulae (I) and (II) have 3 unsaturated functional groups per molecule thereof. The composition of the specific unsaturated compounds of the formulae (I) and (II) effectively causes the resultant outermost cured resin layer to exhibits both a significantly enhanced resistance to yellowing and a satisfactory flexibility even whose the electron beam is irradiated at a level of the exposure dose at which the substrate paper sheet is not deteriorated.

In the unsaturated organic compounds of the formula (I), the total molar amount of the addition reacted propyleneoxide (PO) and/or ethylenexoide (EO) per molecule of the compounds, namely the sum of a, b and c is 1 to 4. This type of the compounds of the formula (I), namely, PO-modified acrylate compounds or EO-modified acrylate compounds, effectively enables the resultant cured resin to exhibits a significantly enhanced yellowing resistance.

Also, in the unsaturated organic compounds of the formula (II), the total molar amount of the addition reacted propyleneoxide (PO) and/or ethyleneoxide (EO) per molecule of the compounds, namely the sum of a', b' and c' is 5 to 8. This type of the compounds of the formula (II), namely PO-modified and/or EO-modified acrylate compounds, effectively enables the resultant cured resin to exhibit a significantly enhanced folding endurance.

By mixing the compounds (A) of the formula (I) with the compounds (B) of the formula (II) in the specific weight ratio ((A)/(B)) of 90/10 to 30/70, preferably 80/20 to 40/60, the resultant outermost cured resin layer exhibits a satisfactory yellowing resistance and an enhanced flexibility for practical use. If the mixing weight ratio ((A)/(B)) is more than 90/10, the resultant outermost cured resin layer exhibits an unsatisfactory flexibility and is sometimes easily broken by bending or folding. Also, if the mixing weight ratio ((A)/(B)) is less than 30/70, the resultant outermost cured resin layer exhibits an unsatisfactory resistance to yellowing.

In the formulae (I) and (II), when R represents a methyl ($-CH_3$) group, the resultant cured resin layer exhibits a higher yellowing resistance than that when R represents a hydrogen atom (—H). However, the methyl group tends to cause a reduction in flexibility of the resultant cured resin. Also, when R represents a hydrogen atom, the resultant cured resin exhibits a higher flexibility than that when R represents a methyl group. Accordingly, the yellowing resistance and flexibility of the cured resin can be controlled by adjusting the molar ratio of the total hydrogen atoms to the total methyl groups for R groups in the formulae (I) and (II) to a desired level.

To obtain the outermost cured resin layer having satisfactory yellowing resistance and flexibility, the dry amount of the outermost cured resin layer is preferably adjusted to a level of 0.5 to 15 g/m$^2$, more preferably 1 to 5 g/m$^2$. When the dry amount is less than 0.5 g/m$^2$, the resultant outermost cured resin layer sometimes exhibits an unsatisfactory resistance to yellowing and a poor surface smoothness. Also, if the dry amount is more than 15 g/m$^2$, the resultant outermost cured resin layer sometimes exhibits an unsatisfactory flexibility and is easily broken or cracked upon being bent or folded.

In the support sheet of the present invention, the electron-beam-curable unsaturated organic compounds for, forming the inside cured resin layer in the front surface coating layer are not limited to a specific type of compound as long as the compound is able to provide a cured resin layer having a relatively low cross-linking density. The unsaturated organic compound may consist of monomers alone, oligomers alone or mixtures thereof. The inside cured resin layer has no possibility of being discolored yellow by the developing treatment, because this layer does not come into contact with the developing liquid, and it is not necessary to have a high cross-linking density.

Therefore, an electron-beam-curable unsaturated organic compound which is converted to a cured resin having a high degree of flexibility, should be selected.

With respect to the electron-beam-curable unsaturated organic compounds, the compounds are not limited to a specific class of compounds having a limited number of functional groups. Preferably, the unsaturated organic compounds are selected from those having less than 4 unsaturated functional groups per molecule thereof to impart a low cross-linking density and a high flexibility to the resultant inside cured resin layer.

The amount of the inside cured resin layer is preferably 5 to 40 g/m$^2$ more preferably 10 to 30 g/m$^2$ If the inside cured resin layer amount is less than 5 g/m$^2$ the resultant inside cured resin layer exhibits a poor surface smoothness (evenness). If the amount is more than 40 g/m$^2$ the curing property of the coated layer at a low exposure dose of electron beam is reduced.

The electron-beam-curable unsaturated organic compound usable for the inside cured resin layer can be selected, for example, from:

(1) acrylate compounds of aliphatic, cycloaliphatic and aromatic alcohols and polyalkyleneglycols;
(2) acrylate compounds of addition reaction products of aliphatic, cycloaliphatic and aromatic alcohols with alkyleneoxides;
(3) polyacryloylalkylphosphoric acid esters;
(4) reaction products of carboxylic acids with polyols and acrylic acid;
(5) reaction products of isocyanates with polyols and acrylic acid;
(6) reaction products of epoxy compounds with acrylic acid; and
(7) reaction products of epoxy compounds with polyols and acrylic acid.

Particularly, the electron-beam-curable unsaturated organic compound is preferably selected from polyoxyethylene-epichloro hydrin-modified bisphenol A diacrylate, dicyclohexyl acrylate, epichlorohydrin-modified polyethyleneglycol diacrylate, 1,6-hexane-diol diacrylate, hydroxypivalic acid ester neopentylglycol diacrylate, nonylphenoxypolyethyleneglycol acrylate, ethyleneoxide-modified phenoxidized phosphoric acid acrylate, ethyleneoxide-modified phthalic acid acrylate, polybutadiene acrylate, caprolactam-modified tetrahydrofurfuryl acrylate, tris(acryloxyethyl)isocyanurate, trimethylolpropane triacrylate, pentaerythritol triacrylate, pentaerythritol tetraacrylate, polyethyleneglycol diacrylate, 1,4-butadienediol diacrylate, neopentylglycol diacrylate, and neopentylglycol-modified trimethylolpropane diacrylate.

In the present invention, these compounds can be used alone or in a mixture of two or more thereof.

In the front surface coating layer of the present invention, to enhance the sharpness of images on the photographic printing paper, a white pigment is preferably contained therein. As the white pigment, titanium dioxide (anatase type and rutile type) is usually employed. Other pigments, for example, barium sulfate, calcium carbonate, aluminum oxide, zinc oxide, magnesium oxide and magnesium hydroxide can also be used. Also, the front surface coating layer can contain another additive, for example, disperging agents, surfactants, and coupling agents, if necessary.

Preferably, the content of the white pigment is 20% to 80% by weight based on the total solid content weight of the front surface coating layer. When the content is less than 20% by weight, the photographic images on the resultant photographic printing paper sometimes exhibit an unsatisfactory sharpness. Also, when the content is more than 80% by weight, the resultant coating layer sometimes exhibits a reduced flexibility and is easily cracked.

To disperse the white pigment in the above-mentioned electron beam-curable unsaturated organic compound, a three roll mill, two roll mill, Caules dissolver, homomixer, sand grinder, Planetary mixer, or ultrasonic disperser can be employed.

The front surface coating layer can be formed in accordance with a conventional method, for example, as disclosed in Japanese Unexamined Patent Publication (Kokai) No. 5-93984. In this method, a coating liquid comprising an electron beam-curable unsaturated organic compound composition for an inside cured resin layer is coated on a front surface of the substrate paper sheet, a coating liquid comprising a specific electron-beam-curable unsaturated organic compound-white pigment composition for an outermost cured resin layer is separately coated on a shaping surface (for example, a peripheral surface of a shaping drum, or a surface of a plastic film), the former coating liquid layer on the substrate paper sheet is laminated on the later coating liquid layer on the shaping surface, and an electron beam irradiation is applied to the laminated coating liquid layers to cure and bond these layers to each other, and then the resultant front surface coating layer is separated together with the substrate paper sheet from the shaping surface.

As a coating procedure of the electron-beam-curable unsaturated organic compound on the shaping surface or the substrate paper sheet surface can be carried out by any of, for example, a bar-coating method, blade-coating method, squeeze-coating method, air knife-coating method, roll-coating method, gravure coating method, or transfer-coating method. Further, for this coating procedure, a fountain coater or slit die coater system can be utilized. Particularly, when a surface of a metal drum is utilized as a shaping surface, a roll coating method using a rubber roll or an offset gravure coating method is preferably used so as not to damage the shaping surface. Otherwise, a non-contact type coater, namely, a fountain coater or slit die coater is beneficially used.

In the formation of the front surface coating layer, the electron-beam accelerator usable for the electron-beam irradiation is not limited to a specific type thereof. For example, a Van de Graaff scanning type, double scanning type and curtain beam type electron beam irradiation apparatuses can be used. Among them, the curtain beam type apparatus, which can provide a high output at a relatively low cost, is beneficially utilized for the formation of the front surface coating layer. When the electron beam is irradiated, the acceleration voltage is not limited to a specific level and is preferably 100 to 300 kV and the absorbed dose is preferably 0.1 to 6 Mrad, more preferably 0.2 to 4 Mrad.

The electron beam irradiations are preferably carried out in an atmosphere having an oxygen content of 500 ppm or less. If the oxygen content is more than 500 ppm, sometimes, oxygen serves as a retarder to cause the unsaturated organic compound composition to be incompletely cured.

When the coating liquid is coated by the transfer-coating method, the electron beam-curable coating liquid layer does not directly come into contact with air during the electron beam irradiation, and thus the oxygen content in the atmosphere during the electron beam irradiation does not need to be reduced. However, for the purpose of preventing a generation of ozone, or of cooling window which is heated when the electron beam passes therethrough, an inert gas can be used for the atmosphere.

In the support sheet of the present invention, the film-forming synthetic resin usable for forming the back surface coating layer is selected from polyolefin resins which are used in the production of conventional support sheets for photographic printing paper, and the above-mentioned electron beam-cured resins.

The polyolefin resins usable for forming the back surface coating layer can be selected from homopolymers of ethylene, and α-olefins, for example, propylene, copolymers of two or more of the above-mentioned olefins, and mixtures of at least two of the above-mentioned polymers. Particularly, preferable polyolefin resins are low density polyethylenes, high density polyethylenes, straight linear low density polyethylenes, and mixtures of the above-mentioned polymers. There is no limitation in the molecular weight of the polyolefin resins. Usually, polyolefin resins have a molecular weight of 20,000 to 200,000. Optionally, the polyolefin resins are mixed with a small amount of an antioxidant and a lubricant.

When the back surface coating layer is formed by using the polyolefin resin, a customary melt-extrude-coating method can be employed.

Also, the back surface coating layer can be formed from an electron beam-curable unsaturated organic compound. For this purpose, all the compounds usable for forming the above-mentioned front surface coating layer can be used. Further, the method for forming the back surface resin coating layer may be the same as that for the front surface coating layer. The back surface layer may also have a laminate structure. There is no limitation on the weight of the back surface resin coating layer. Usually, the weight of the back surface resin coating layer is in the range of from 10 to 40 $g/m^2$.

The substrate paper sheet usable for the present invention usually has a basis weight of 50 to 300 $g/m^2$ and is provided with smooth surfaces. All the customary substrate paper sheets usable for the conventional support sheets for the photographic printing paper can be utilized for the present invention. The natural pulp usable for forming the substrate paper sheet is selected from soft wood pulp, hard wood pulp and mixtures of soft wood pulp and hard wood pulp. The substrate paper sheet may contain therein a filler.

For the purpose of preventing the fogging of the resultant photographic printing sheet generated during a long period of storage, a magnesium compound, for example, magnesium hydroxide, magnesium oxide, and magnesium salts, for example, magnesium carbonate or magnesium sulfate, is effectively contained in the substrate paper sheet. Further, conventional additives, for example, a sizing agent, a fixing agent, a paper strengthening agent, a filler, an antistatic agent, a pH-regulating agent, a pigment and a dye usable for conventional paper may be added to the substrate paper sheet. Further, the substrate paper sheet may have a coating layer consisting of a surface-sizing agent, a pigment, a dye or an antistatic agent, applied on a surface thereof.

EXAMPLES

The present invention will be further explained by way of specific examples which are only representative and do not limit the scope of the present invention in any way.

Example 1

The back surface of a substrate paper sheet having a basis weight of 180 $g/cm^2$ is surface activated by applying a corona discharge treatment, and then coated with a polyethylene resin by a melt-extrude-coating method, to form a back surface resin coating layer having a coating weight of 30 $g/m^2$.

Separately, a mixture (composition 1) of an electron-beam-curable unsaturated organic compound of the formula (I) in which R is a methyl group and the sum of a, b and c is 3, namely tri-PO-modified trimethylolpropane triacrylate, an electron-beam-curable unsaturated organic compound of the formula (II) in which R is a hydrogen atom and the sum of a′, b′ and c′ is 6, namely hexa-EO-modified trimethylolpropane-triacrylate, and a white pigment for forming an outermost used resin layer was prepared with the following composition.

Composition (1)

| Component | Amount (part by weight) |
|---|---|
| Tri-PO-modified trimethylolpropane triacrylate (A) | 45.0 |
| Hexa-EO-modified trimethylolpropane triacrylate (B) | 5.0 |
| Titanium dioxide (trademark: Taipaque A-220, made by Ishihara Sangyo K.K.) | 50.0 |

Note: The weight ratio of tri-PO-modified trimethylolpropane triacrylate (A) to hexa-EO-modified trimethylolpropane triacrylate is 90:10

The mixture of the above-mentioned components was dispersed by using a paint conditioner for one hour to provide an electron beam-curable composition.

The composition (1) was coated on a surface of a chromium-plated metal plate employed as a shaping surface, by using a wire bar to form a coating liquid layer having a weight of 3 $g/m^2$ after curing.

To this coating liquid layer, an electron beam irradiation was applied under an accelerating voltage of 175 kV at an absorbed dose of 2 Mrad to cure the coating liquid layer and to provide an outermost cured resin layer.

Separately, a mixture (composition (2)) of an electron-beam-curable unsaturated organic compound with a white pigment for forming an inside coating liquid layer was prepared with the following composition.

Composition (2)

| Component | Amount (part by weight) |
|---|---|
| Electron beam-curable compound composition (trademark: SN-5X 2671, made by Sunnopco) | 50.0 |
| Titanium dioxide (trademark: Taipaque A-200, made by Ishihara Sangyo K.K.) | 50.0 |

The mixture of the above-mentioned components was dispersed by using a paint conditioner for one hour to provide an electron-beam-curable composition.

The composition (2) was coated on a front surface of the substrate paper sheet by using a wire bar to form a coating liquid layer having a coating weight of 25 $g/m^2$ after curing. This coating liquid layer was laminated on the outermost cured resin layer on the shaping metal plate surface, and the resultant laminated layers were subjected to an electron-beam irradiation under an acceleration voltage of 175 kV at an absorbed dose of 2 Mrad to cure and bond the resultant inside cured resin layer to the resultant outermost cured resin layer. The resultant laminate was peeled off from the metal plate shaping surface. A support sheet for photographic printing paper was produced.

The resultant support sheet was subjected to evaluation test of yellowing property and flexibility thereof.

Yellowing Property

To test the yellowing property of the support sheet by a developing treatment, specimens of the support sheet were subjected to a developing treatment using a Darst Automatic Developing Machine (trademark: RCP20, made by Darst Co.).

To evaluate the yellowing property of the specimens of the support sheet after the developing treatment, the b values of the specimens before and after the developing treatment were measured in accordance with the L a b measurement method of TAPPI-T524 (1979), and a difference (Δb value) between the b value before the developing treatment and the b value after the developing treatment was calculated. The difference value Δb was utilized as an indicator for evaluating the yellowing property. The result of the test was indicated in Table 1. When the Δb value is less than 1.0, the resultant support sheet can be practically used, and when the Δb value is 1.0 or more, the resultant product is not usable in practice.

Flexibility

The test for the flexibility of the support sheet was carried out by winding a specimen of the support sheet around a circular rod having a diameter of 0.1 cm in such a manner that the front surface coating layer was on the outside of the wound specimen, and the degree of crack formation in the specimen was observed.

The evaluation result was indicated in three classes in the following manner.

| | |
|---|---|
| No cracks were formed | 3 points |
| Cracks were slightly formed | 2 points |
| Broken | 1 point |

The support sheet scoring 3 points in the flexibility test was practically usable, whereas the support sheet scoring 1 or 2 points was not usable in practice. The test results are indicated in Table 1.

Example 2

A photographic printing paper support sheet was produced by the same procedures as in Example 1, except that in the preparation of the coating liquid composition for the outermost cured resin layer, the weight ratio of the tri-PO-modified trimethylolpropane triacrylate to the hexa-EO-modified trimethylolpropane triacrylate was changed from 90:10 to 80:20, to provide a coating liquid composition (3).

The test results are shown in Table 1.

Example 3

A photographic printing paper support sheet was produced by the same procedures as in Example 1, with the following exceptions.

In place of the coating liquid composition 1, a coating liquid composition (4) comprising the tri-PO-modified trimethylolpropane triacrylate (A) and the hexa-EO-modified trimethylolpropane triacrylate in a mixing weight ratio ((A)/(B)) of 70:30 was employed.

The test results are indicated in Table 1.

Example 4

A photographic printing paper support sheet was produced by the same procedures as in Example 1, with the following exceptions.

In place of the coating liquid composition 1, a coating liquid composition (5) comprising the tri-PO-modified trimethylolpropane triacrylate (A) and the hexa-EO-modified trimethylolpropane triacrylate in a mixing weight ratio ((A)/(B)) of 60:40 was employed.

The test results are indicated in Table 1.

Example 5

A photographic printing paper support sheet was produced by the same procedures as in Example 1, with the following exceptions.

In place of the coating liquid composition 1, a coating liquid composition (6) comprising the tri-PO-modified trimethylolpropane triacrylate (A) and the hexa-EO-modified trimethylolpropane triacrylate in a mixing weight ratio ((A)/(B)) of 40:60 was employed.

The test results are indicated in Table 1.

Example 6

A photographic printing paper support sheet was produced by the same procedures as in Example 1, with the following exceptions.

In place of the coating liquid composition 1, a coating liquid composition (7) comprising the tri-PO-modified trimethylolpropane triacrylate (A) and the hexa-EO-modified trimethylolpropane triacrylate in a mixing weight ratio ((A)/(B)) of 30:70 was employed.

The test results are indicated in Table 1.

Example 7

A photographic printing paper support sheet was produced by the same procedures as in Example 1, with the following exceptions.

In place of the coating liquid composition 1, a coating liquid composition (8) comprising the tri-EO-modified trimethylolpropane triacrylate (A) and the hexa-EO-modified trimethylolpropane triacrylate in a mixing weight ratio ((A)/(B)) of 70:30 was employed.

The test results are indicated in Table 1.

Example 8

A photographic printing paper support sheet was produced by the same procedures as in Example 1, with the following exceptions.

In place of the coating liquid composition 1, a coating liquid composition (9) comprising the tri-EO-modified trimethylolpropane triacrylate (A) and the hexa-EO-modified trimethylolpropane triacrylate in a mixing weight ratio ((A)/(B)) of 50:50 was employed.

The test results are indicated in Table 1.

Comparative Example 1

A photographic printing paper support sheet was produced by the same procedures as in Example 1, with the following exceptions.

In place of the coating liquid composition 1, a coating liquid composition (10) comprising the tri-PO-modified trimethylolpropane triacrylate (A) and the hexa-EO-modified trimethylolpropane triacrylate in a mixing weight ratio ((A)/(B)) of 95:5 was employed.

The test results are indicated in Table 1.

Comparative Example 2

A photographic printing paper support sheet was produced by the same procedures as in Example 1, with the following exceptions.

In place of the coating liquid composition 1, a coating liquid composition (11) comprising the tri-PO-modified trimethylolpropane triacrylate (A) and the hexa-EO-modified trimethylolpropane triacrylate in a mixing weight ratio ((A)/(B)) of 20:80 was employed.

The test results are indicated in Table 1.

Comparative Example 3

A photographic printing paper support sheet was produced by the same procedures as in Example 1, with the following exceptions.

In place of the coating liquid composition 1, a coating liquid composition (12) comprising the tri-PO-modified trimethylolpropane triacrylate (A) and the hexa-EO-modified trimethylolpropane triacrylate in a mixing weight ratio ((A)/(B)) of 10:90 was employed.

The test results are indicated in Table 1.

Comparative Example 4

A photographic printing paper support sheet was produced by the same procedures as in Example 1, with the following exceptions.

In place of the coating liquid composition (1), a coating liquid composition (13) was prepared in the following composition.

Composition (13)

| Component | Amount (part by weight) |
|---|---|
| Caprolactone-modified dipentaerythritol hexa-acrylate (*)1 | 50.0 |
| Titanium dioxide (trademark: Taipaque A-220, made by Ishihara Sangyo K.K.) | 50.0 |

Note: (*)1 . . . Trademark: Kayarad DPCA-30, made by Nihon Kayaku K.K., containing 3 caprolactone-modified acryloyl groups per molecule)

The test results are shown in Table 1.

Comparative Example 5

A photographic printing paper support sheet was produced by the same procedures as in Example 1, with the following exceptions.

In place of the coating liquid composition (1), a coating liquid composition (14) was prepared in the following composition.

Composition (14)

| Component | Amount (part by weight) |
|---|---|
| Pentaerythritol hexa-acrylate (*)2 | 37.5 |
| 1,9-Nonanediol diacrylate monomer (*)3 | 12.5 |
| Titanium dioxide (trademark: Taipaque A-220, made by Ishihara Sangyo K.K.) | 50.0 |

Note: (*)2 . . . Trademark: Beam Set 700, made by Arakawa Kagaku Kogyo K.K.
(*)3 . . . Trademark: New Frontier L-C9A, made by Daiichi Kogyoseiyaku K.K.

The test results are shown in Table 1.

Comparative Example 6

A photographic printing paper support sheet was produced by the same procedures as in Example 1, with the following exceptions.

In place of the coating liquid composition (1), a coating liquid composition (15) was prepared in the following composition.

Composition (15)

| Component | Amount (part by weight) |
|---|---|
| Caprotactone-modified dipentaerythritol hexa-acrylate (*)4 | 45.5 |
| 1,9-Nonanediol diacrylate monomer (*)3 | 5.0 |
| Titanium dioxide (trademark: Taipaque A-220, made by Ishihara Sangyo K.K.) | 50.0 |

Note: (*)4 . . . Trademark: Kayarad DPCA-60, made by Nihon Kayaku K.K.

The test results are shown in Table 1.

Comparative Example 7

A photographic printing paper support sheet was produced by the same procedures as in Example 1, with the following exceptions.

In place of the coating liquid composition (1), a coating liquid composition (16) was prepared in the following composition.

Composition (16)

| Component | Amount (part by weight) |
|---|---|
| Tri-functional urethane acrylate oligomer (*)5 | 50.0 |
| Titanium dioxide (trademark: Taipaque A-220, made by Ishihara Sangyo K.K.) | 50.0 |

Note: (*)5 . . . Trademark: New Frontier R-1301, made by Daiichi Kogyoseiyaku K.K.

Comparative Example 8

A photographic printing paper support sheet was produced by the same procedures as in Example 1, with the following exceptions.

In place of the coating liquid composition (1), a coating liquid composition (17) was prepared in the following composition.

Composition (17)

| Component | Amount (part by weight) |
|---|---|
| Pentaerythritol tetra-acrylate (*)6 | 50.0 |
| Titanium dioxide (trademark: Taipaque A-220, made by Ishihara Sangyo K.K.) | 50.0 |

Note: (*)6 . . . Trademark: Beam Set 710, made by Arakawa Kagaku Kogyo K.K.

The test results are shown in Table 1.

TABLE 1

| | | Item | | | |
|---|---|---|---|---|---|
| | | Type of coating liquid composition | | Test result | |
| Example No. | | Outermost cured resin layer | Inside cured resin layer | Yellowing (Δb value) | Flexibility |
| Example | 1 | (1) | (2) | 0.4 | 3 |
| | 2 | (3) | (2) | 0.5 | 3 |
| | 3 | (4) | (2) | 0.6 | 3 |
| | 4 | (5) | (2) | 0.7 | 3 |
| | 5 | (6) | (2) | 0.7 | 3 |
| | 6 | (7) | (2) | 0.7 | 3 |
| | 7 | (8) | (2) | 0.3 | 3 |
| | 8 | (9) | (2) | 0.5 | 3 |
| Comparative Example | 1 | (10) | (2) | 0.4 | 2 |
| | 2 | (11) | (2) | 1.0 | 3 |
| | 3 | (12) | (2) | 1.0 | 3 |
| | 4 | (13) | (2) | 0.5 | 1 |
| | 5 | (14) | (2) | 0.6 | 1 |
| | 6 | (15) | (2) | 1.9 | 3 |
| | 7 | (16) | (2) | 9.2 | 3 |

TABLE 1-continued

| | Item | | | |
|---|---|---|---|---|
| | Type of coating liquid composition | | | |
| Example No. | Outermost cured. resin layer | Inside cured resin layer | Test result: Yellowing (Δb value) | Test result: Flexibility |
| 8 | (17) | (2) | 0.3 | 1 |

As Table 1 clearly indicates, the support sheet of the present invention exhibited both a significantly enhanced resistance to yellowing and a satisfactory flexibility in spite of the fact that electron-beam-cured resin layers are formed on a substrate paper sheet, and thus is very useful for practical use.

We claim:

1. A support sheet for photographic printing sheet, comprising:

a substrate paper sheet;

a front surface coating layer formed on a front surface of the substrate paper sheet and comprising an electron-beam-cured resin product of at least one unsaturated organic compound which is curable by an electron-beam irradiation; and a back surface coating layer formed on a back surface of the substrate paper sheet and comprising a film-forming synthetic resin, said front surface coating layer having a laminate structure which comprises an inside cured resin layer located adjacent to the substrate paper sheet and an outermost cured resin layer located in an outermost front surface side of the support sheet, and the outermost cured resin layer comprising an electron-beam-cured resin product derived from a coating composition which comprises (A) at least one unsaturated organic compound of the formula (I) and (B) at least one unsaturated organic compound of the formula (II):

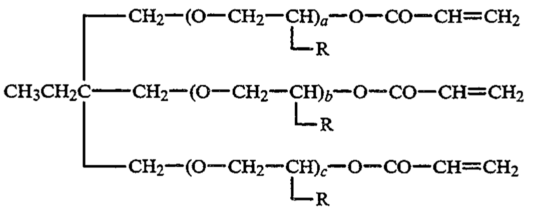
(I)

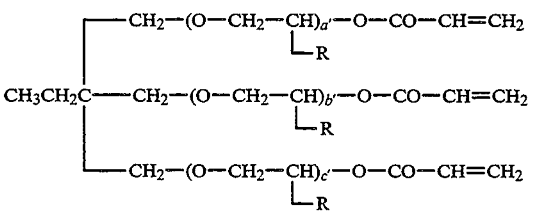
(II)

in which formula (I) and (II), R represents a member selected from a group consisting of a hydrogen atom and a methyl group, a, b and c respectively and independently from each other represent zero or an integer of 1 to 4, the sum of a, b and c is 1 to 4, a', b' and c' respectively and independently from each other represent zero or an integer of 1 to 8 and the sum of a', b' and c' is 5 to 8, in a weight ratio of the compound (A) of the formula (I) to the compound (B) of the formula (II) of 30/70 to 90/10.

2. The support sheet as claimed in claim 1, wherein the outermost cured resin layer is present in an amount of 0.5 to 15 $g/m^2$.

3. The support sheet as claimed in claim 1, wherein the front surface coating layer comprises a white pigment in an amount of 20 to 80% by weight based on the total weight of the front surface coating layer.

4. The support sheet as claimed in claim 1, wherein the electron-beam-curable unsaturated organic compound for the inside cured resin layer is selected from the group consisting of:

(1) acrylate compounds of aliphatic, cycloaliphatic and aromatic alcohols and polyalkyleneglycols, (2) acrylate compounds of addition reaction products of aliphatic, cycloaliphatic and aromatic alcohols with alkyleneoxides, (3) polyacryloylalkylphosphoric acid esters, (4) reaction products of carboxylic acids with polyols and acrylic acid, (5) reaction products of isocyanates with polyols and acrylic acid, (6) reaction products of epoxy compounds with acrylic acid, and (7) reaction products of epoxy compounds with polyols and acrylic acid, 5. The support sheet for photographic printing paper as claimed in claim 1, wherein the electron-beam-curable unsaturated organic compound for the inside cured resin layer is selected from the group consisting of polyoxyethylene-epichlorohydrin-modified bisphenol A diacrylate, dicyclohexylacrylate epichlorohydrin-modified polyethyleneglycol diacrylate, 1,6-hexanediol diacrylate, hydroxypivalic acid ester neopentylglycol diacrylate, nonylphenoxypolyethyleneglycol acrylate, ethyleneoxide-modified phenoxidized phosphoric acid acrylate, ethyleneoxide-modified phthalic acid acrylate, polybutadiene acrylate, caprolactam-modified tetrahydrofurfuryl acrylate, tris(acryloxyethyl) isocyanurate, trimethylolpropane triacrylate, pentaerythritol triacrylate, pentaerythritol tetraacrylate, polyethyleneglycol diacrylate, 1,4-butadienediol diacrylate, neopentylglycol diacrylate, and neopentylglycol-modified trimethylolpropane diacrylate.

6. The support sheet for photographic printing paper as claimed in claim 1, wherein the outermost cured resin layer has a higher density of crosslinking than that of the inside cured resin layer.

7. The support sheet for photographic printing paper as claimed in claim 1, wherein the electron-beam-curable unsaturated organic compound for the inside cured resin layer has less than four crosslinking functional groups per molecule thereof.

8. The support sheet as claimed in claim 1, wherein the inside cured resin layer is in an amount of 5 to 40 $g/m^2$.

9. The support sheet as claimed in claim 1, wherein the film-forming synthetic resin for the back surface coat layer is selected from the group consisting of polyolefin resins and electron-beam-cured resins derived from electron-beam-curable unsaturated organic compounds.

10. The support sheet as claimed in claim 1, wherein the back surface coating layer is in an amount of 10 to 40 $g/m^2$.

11. The support sheet as claimed in claim 1, wherein the substrate paper sheet has a basis weight of 50 to 300 $g/m^2$.

12. The support sheet for photographic printing paper as claimed in claim 1, wherein the outermost cured resin layer further comprises a white pigment consisting of at least one member selected from the group consisting of titanium dioxide, barium sulfate, calcium carbonate, aluminum oxide, zinc oxide, magnesium hydroxide and magnesium oxide.

13. The support sheet for photographic printing paper as claimed in claim 12, wherein the white pigment is present in a total amount of 20 to 80% by weight based on the total solid content weight of the front surface cured resin layer.

* * * * *